INVENTOR.
ROBERT D. SALTSMAN

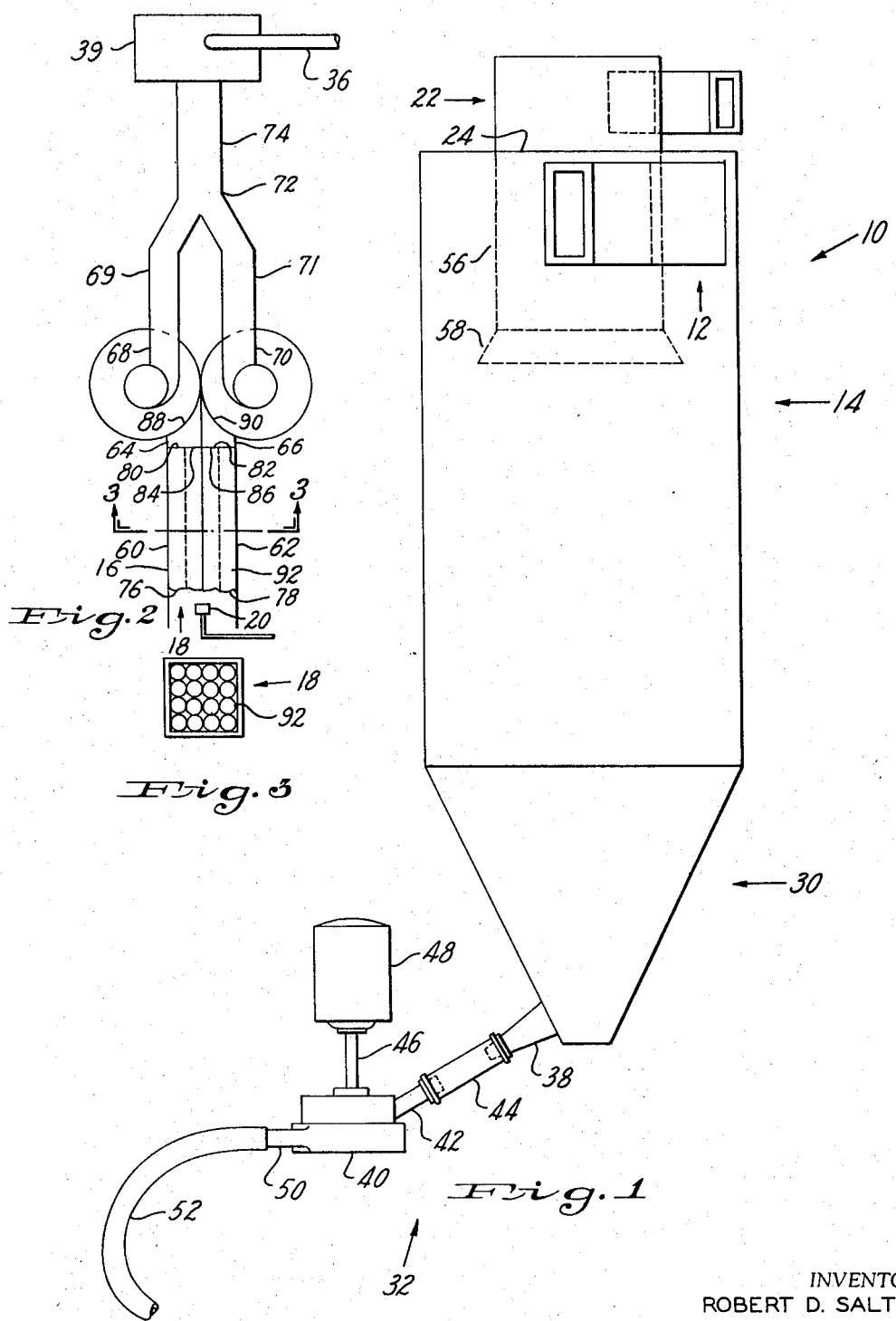

United States Patent Office 3,443,364
Patented May 13, 1969

3,443,364
DUST COLLECTOR
Robert D. Saltsman, Delmont, Pa., assignor to Bituminous Coal Research Inc., Monroeville, Pa., a corporation of Delaware
Filed Dec. 9, 1966, Ser. No. 600,524
Int. Cl. B01d 47/06
U.S. Cl. 55—237                                     3 Claims

ABSTRACT OF THE DISCLOSURE

A wet type dust collector for separating dust particles as a slurry from dust laden air. The dust collector includes a cyclone type separator with an inlet opening, a clean air outlet opening and a slurry outlet opening. A scrubber duct is connected to the separator inlet opening and has a plurality of stacked tubes that serve as an air straightener and as surfaces for supporting a liquid film. A spray nozzle is positioned at the inlet end of the scrubber duct and is operable to spray water in droplet form into the air stream to wet the dust particles in the air stream entering the scrubber duct. The surfaces of the stacked tubes within the scrubber duct support a liquid film of the spray water for impinging other dust particles as the air flows through the scrubber duct. At the outlet end of the stacked tubes the liquid film is discharged into the separator as droplets to further wet the dust particles in the air stream. Within the separator there is an internal involute duct connected to the inlet of the separator and having an outlet opening located below the clean air outlet to eliminate effluent loss through the clean air outlet.

---

This invention relates to cyclone separators or similar centrifugal separators for removal of dust or other fine materials from gases. More particularly, the invention is directed to an improved wet-type cyclone separator adapted to be used to collect coal dust and to be located in near proximity to where the coal dust is produced, such as, at the face where the coal is dislodged, conveyor transfer points where the coal is transferred from one conveyor to another, or at any location of movement of the coal underground where dust conditions are created.

In the course of underground coal mining operations, especially drilling, cutting, and continuous mechanical mining at the coal face, an undesirable amount of fine dust is produced. This dust is distributed throughout the mine by the ventilating air within the mine from its primary source of production, the mining face, and from all points where the coal is subsequently handled prior to removal from the mine. The entire size range of the dust particles up to 200 mesh (74 microns) presents an explosion propagation hazard and the minus 5 micron size presents a hazard to health.

In order to alleviate the dust problem adequately it must be collected as close to the point of liberation as possible, however, available space in the mine is limited. Known dust collectors with high collection efficiencies on small dust particles are bulky and, in general, not suited for use underground. Also, the collected dust must be continuously removed and in a form that does not present an explosion hazard itself.

It has been known to separate fine dust from the atmosphere by subjecting the dust laden air to a centrifugal force within a dust separator container. The centrifugal force swirls the dust laden air in the container projecting the dust particles to the side of the container and literally separates them from the air. The clean air, free of dust particles, is then directed out of the container. However, these devices are of limited efficiency with respect to minus 5 micron dust particles. In order to improve their effectiveness on separating the minus 5 micron dust particles from the air the dust laden gas is wetted by subjecting it to a water spray prior to entrance into the dust separator container.

In well-known prior art wet-type cyclone separators having a separation chamber including a dust laden gas inlet duct and clean gas outlet and a collection chamber including a dust discharge outlet, a gas laden with dust particles and wetted by the introduction of water in the dust laden gas inlet duct is pulled by a vacuum pump connected to the clean gas outlet duct into the separation chamber. The gas enters the separation chamber tangentially through the dust laden gas inlet duct into the annular space between the separation chamber body and the clean gas outlet duct. The gas begins to swirl through the separation chamber traversing a helical path. The swirling of the gas causes the dust particles to be moved by centrifugal force in the direction of the wall of the separation chamber. The dust particles are trapped in a water film flowing in the direction of swirling gas flow along the wall toward the collection zone at the bottom of the separation chamber. The dust particles are collected in the collection zone in the form of a slurry and discharged through the dust discharge outlet. The gas, with the dust particles separated therefrom, flows out through the clean gas outlet duct.

In these prior art devices, however, the dust laden air wetted by water which enters the separation chamber through the dust laden gas inlet duct impinges onto the clean gas outlet duct forming a stream of running water or effluent. The effluent with the encapsulated dust particles creates an effluent loss out through the clean gas outlet. In utilization of the cyclone separator for the removal of coal dust which contains abrasive materials such as pyrites, this effluent loss would eventually enter the vacuum pump connected to the clean gas outlet duct. Within a very short period of time the cyclone separator's efficiency would be reduced through corrosion, abrasion and the like and would have to be shut down and the vacuum pump cleaned to maintain an operative apparatus.

Various attempts have been made to eliminate such effluent loss and maintain the high separating efficiency essential to remove the minus 5 micron dust particles such as providing a drip skirt at the bottom of the clean gas outlet duct or a series of baffles and deflectors positioned within the inlet duct or within the separation chamber. However, such attempts have not been satisfactory. With the use of drip skirts the water that impinges on the outside of the clean gas outlet duct and the water carried onto this surface by eddy currents created at the top of the separation chamber are not reentrained in the main gas stream at the edge of the drip skirt as they are meant to, but instead, the water follows the surface of the drip skirt and short circuits directly to the clean air outlet duct. With the use of baffles and deflectors the water does not impinge directly on the outside of the clean gas outlet but their use does not eliminate the effluent loss to the clean gas outlet.

Briefly, the present invention overcomes the problem of effluent loss through the clean gas outlet duct and its attendant damage to the vacuum pump by providing air straighteners within a scrubber duct connected to a dust particle laden gas inlet duct and an involute entrance duct positioned within the cyclone separator separation chamber.

In an attempt to eliminate the effluent loss it was thought that if an involute duct would be positioned within the separation chamber of the cyclone separator to direct the water and gas laden air downwardly towards the bottom of the separation chamber thereby introducing the water and dust laden air at a point spaced from the clean air outlet duct that the effluent loss would be eliminated. However, with such a duct positioned within the separation chamber the effluent loss was not completely eliminated but a much smaller amount to what had initially been encountered still appeared.

It was also attempted, because it was believed that the problem of effluent loss resulted from the fact that the majority of the spray water impinged on the walls of the dust particle laden gas inlet duct much too rapidly, to eliminate the effluent loss by placing an air straightener consisting of a series of stacked tubes within a scrubber duct connected to the dust particle laden gas inlet duct. It was thought that this would have the effect of keeping the water droplets in the gas stream for a longer period of time, and reduce the quantity of water film on the top and sides of the dust particle laden gas inlet duct. It was found that the effluent loss was reduced through the clean air outlet duct substantially but was not eliminated to the extent of eliminating contamination of the vacuum pump.

It appears that the spray water from the spray nozzle positioned within the scrubber duct is impinged on the walls of all the tubes of the air straightener both inside and outside as a film and is not impinged only on the inner walls of the duct connected to the dust particle laden gas inlet duct as had been so without the straighteners. It appears that the air straighteners distributed the wetted gaseous stream throughout the cross-section of the scrubber duct so that the gaseous stream is in laminar flow and perhaps the pressure drop through the straighteners causes the water to drop toward the bottom of the dust particle laden gas inlet duct where it enters the cyclone at the farthest point from the clean gas outlet thereby reducing the effluent loss.

It was discovered, however, with the air straighteners positioned within the scrubber duct connected to the dust particle laden gas inlet duct and the involute entrance duct positioned within the separation chamber of the cyclone and connected to the dust particle laden gas inlet duct, that the effluent no longer entered clean air outlet duct. With this arrangement it is now possible, as previously discussed, to provide a vacuum means to pull dust laden air from the surrounding atmosphere into the cyclone separator without damage thereto. It appears that the combination of scrubber duct with the air straightener therein and the involute entrance duct within the cyclone is essential to eliminate all effluent loss through the clean gas outlet duct.

Accordingly, it is a primary object of the present invention to provide a wet-type cyclone separator that will eliminate the effluent loss through the clean gas outlet duct and thereby eliminate the damaging effect thereof on the vacuum producing means of the cyclone separator.

Another object of the present invention is to provide a wet-type cyclone separator of high efficiency, small in size and adapted to be utilized to collect coal dust as close to the point of liberation as possible.

A further object of the present invention is to provide a wet-type cyclone separator adapted to continuously remove the collected coal dust in the form of a slurry which does not present an explosion hazard.

Still another object of the present invention is to provide a wet-type cyclone separator in which the dust collected in the form of a slurry may be deposited back onto coarser coal at the mine face and on conveyors thereby further wetting it and allaying dust production.

These and other objects and advantages of this invention will be more completely disclosed and described in the following specification, the accompanying drawings and the appended claims.

In the drawings:

FIGURE 1 is a longitudinal view of the wet-type cyclone separator with the scrubber duct connected to the dust particle laden gas inlet duct containing the air straighteners removed.

FIGURE 2 is a plan view of two wet-type cyclone separators operated in parallel including the air straighteners positioned within the scrubber duct connected to the dust particle laden gas inlet duct.

FIGURE 3 is a view taken along the line 3—3 of FIGURE 2.

Figure 4:
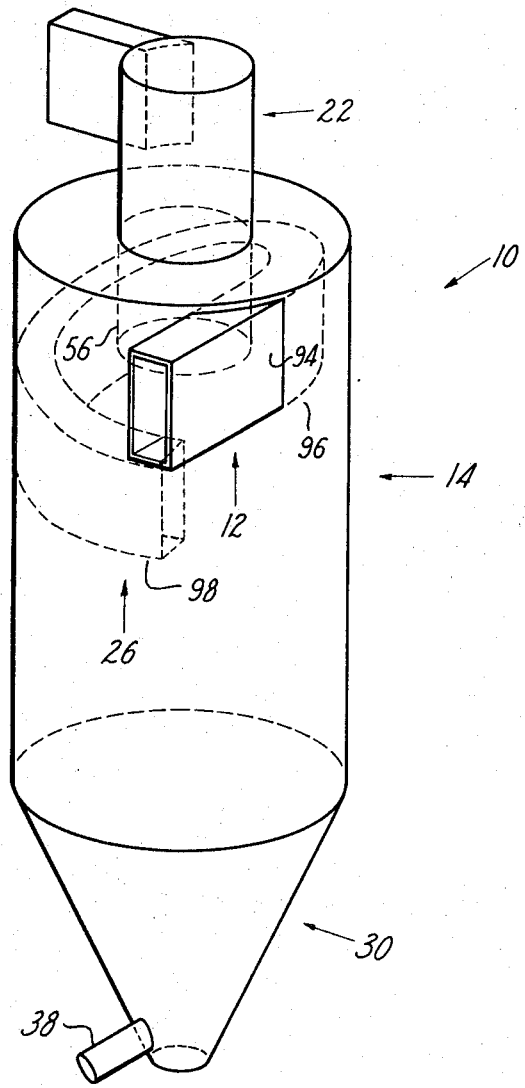
FIGURE 4 is a longitudinal view of the wet-type cyclone separator showing a rectangular involute entrance duct positioned within the cyclone.

Referring now to the drawings there is shown a wet-type cyclone separator having an elongated body portion 10. A dust particle laden gas inlet duct shown generally at 12 is connected to a cylindrically shaped separation chamber shown generally at 14 and it forms one part of the elongated body portion of the cyclone separator 10. Leading to dust particle laden gas inlet duct 12 is a scrubber duct shown generally at 16 (FIGURE 2) having an air straightener positioned therein shown generally at 18. Also positioned and centered within scrubber duct 16 is a water spray nozzle 20. A clean air outlet duct shown generally at 22 is located in the opening 24 in the top of separation chamber 14. Positioned within the upper portion of separation chamber 14 is an internal involute inlet duct shown generally at 26 and 28 (shown in FIGURES 4 and 5 respectively). Below separation chamber 14 and integral therewith is a conically shaped collection chamber shown generally at 30 and it forms the other part of the elongated body portion of the cyclone separator 10. Positioned at the bottom of collection chamber 30 is a slurry discharge system shown generally at 32.

In operation the cyclone separator has air laden with dust particles, such as coal dust, drawn in through scrubber duct 16 in the form of a gaseous stream and the gaseous stream is wetted therein by water from spray nozzle 20. The wetted dust particles pass through air straightener 18 and pass into dust particle laden gas inlet duct 12. The wetted dust laden air is drawn into the cyclone by a vacuum pump 39 (FIGURE 2) connected to clean air outlet duct 74. The wetted dust laden air enters the cyclone and swirls through internal involute inlet duct 26 or 28 (shown in FIGURES 4 and 5) within separation chamber 14 traversing a helical path. The swirling gas causes the dust particles to be moved by centrifugal force in the direction of the wall of separation chamber 14. The dust particles are trapped in a water film flowing in the direction of the swirling gas flow along the wall of the separation chamber 14 toward the collection chamber 30. The dust particles in the form of a slurry are discharged through slurry discharge system 32. The air, with the dust particles separated therefrom, flows out through clean air outlet duct 22 and eventually flows out through vacuum pump clean air discharge outlet 36 with no effluent loss occurring through the clean air outlet duct 22.

Referring in more detail to FIGURE 1 the slurry discharge system consists of a slurry discharge outlet 38 at the bottom of collection chamber 30. Slurry discharge outlet 38 is connected to a slurry discharge pump 40 having an inlet 42 by means of coupling 44. Pump 40 is driven by flexible drive cable 46 connected at one end to pump 40 and at the other end to a motor 48. Pump outlet 50 is connected to a flexible slurry discharge conduit 52. The slurry is continuously removed from the collection chamber 30 through slurry discharge system 32. The slurry may be deposited, for example, on coarse coal on an elevated conveyor of a continuous miner with an acceptable moisture increase in the 3–4 tons of coal per minute mined by the continuous miner. As it is required to provide a seal between the wet-type cyclone separator 10 and the atmosphere, which simply means that it is necessary to pump the slurry against a pressure head that is greater than the vacuum at the bottom of the cyclone separator 10, the pumping of the slurry from the bottom of the cyclone separator 10 and the discharge thereof to the elevated coal conveyor would provide such a seal.

Clean air outlet duct 22 is positioned in opening 24 in the top of separation chamber 14 and has a depending portion 56 and a flange portion or drip skirt 58 at the bottom thereof.

Referring now in detail to FIGURES 2 and 3, there is shown a pair of cyclones operating in parallel. The cyclones having their scrubber ducts 60 and 62 and dust particle laden gas inlet ducts 64 and 66 combined in a set. Clean air outlet conduits 68 and 70 are connected to clean gas outlet ducts 69 and 71, respectively and are joined at 72 to form a single clean air outlet conduit 74 which is connected to vacuum pump 39.

Scrubber ducts 60 and 62 have inlet end portions 76 and 78 and outlet end portions 80 and 82, respectively. Outlet end portions 80 and 82 are connected to the dust particle laden gas inlet ducts 64 and 66, respectively. Dust particle gas inlet ducts 64 and 66 have openings 84 and 86 therein, respectively for conveying the dust laden gaseous stream into the separation chambers of the cyclone separators through openings 88 and 90, respectively, in the wall of the separation chambers. If the wet-type cyclone separator 10 is to be part of a continuous mining machine this parallel arrangement would be compatible with positioning two horizontal ducts parallel to and above the conveyor in the main body of the continuous miner.

Positioned within the scrubber ducts 60 and 62 between the inlet end portions 76 and 78 and outlet end portions 80 and 82 are sets of suitable elongated tubes 92 stacked one atop the other and adjacent one another arranged in a honeycomb pattern as illustrated in FIGURE 3, the purpose of which has already been described. Also, positioned and centered within scrubber ducts 60 and 62 is a water spray nozzle 20 to wet the dust laden air being pulled into the cyclones. While only one spray nozzle has been illustrated it is to be understood that more than one may be utilized to wet the dust laden air.

Figure 5:
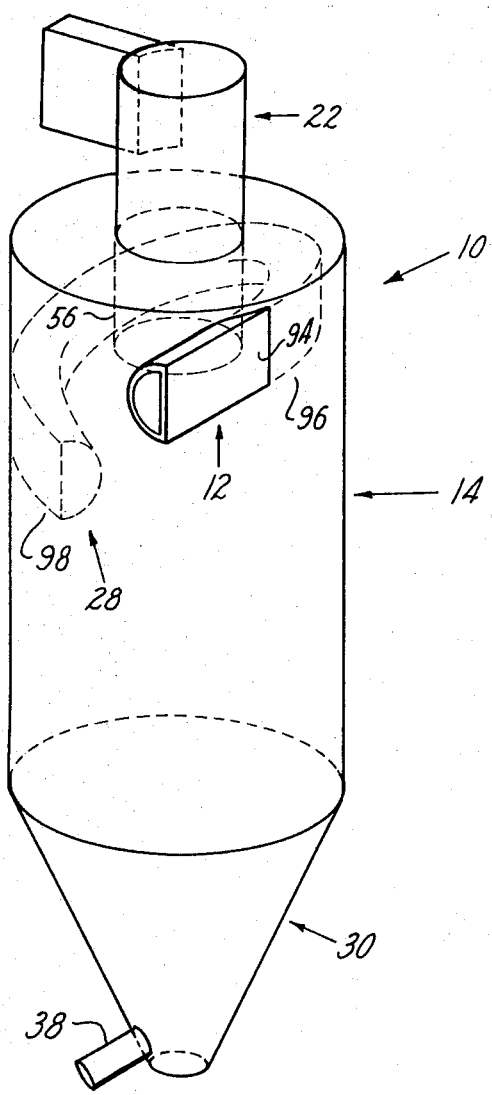
FIGURE 5 is a longitudinal view of the wet-type cyclone separator showing a semicircular involute entrance duct positioned within the cyclone.

Referring now to FIGURE 4, internal involute inlet duct 26 of rectangular cross-section is connected to dust particle laden gas inlet duct 12 at opening 94 in the wall of separation chamber 14. Internal involute inlet duct 26 has an inlet end 96 and an outlet end 98. The inlet end 96 is connected to dust particle laden gas inlet duct 12 at opening 94. The internal involute inlet duct 96 is secured to the wall of separation chamber 14 and extends downwardly from the opening 94 in the form of a helix with the outlet end 98 terminating below the depending portion 56 of clean gas outlet duct 22. The purpose of the involute entrance duct 26 has already been described above. While the involute entrance duct with a rectangular cross-section does an excellent job of eliminating the effluent loss it appears that an involute entrance duct with a semicircular cross-section illustrated in FIGURE 5, does the equivalent but with a shorter length since the slightest centrifugal force would cause the entire water film to run to the outside wall of the cyclone. The use of an involute entrance duct of semicircular cross-section would also allow the use of standard round tubing for the dust particle laden gas inlet duct 12.

As was stated an object of the present invention is to provide a wet-type cyclone separator of high efficiency, small in size and adapted to be utilized to collect coal dust as close to the point of liberation as possible, the previously described device accomplishes this. The wet-cyclone separator described may, for example, be utilized in conjunction with now existing or future continuous mining machines. The addition of the described cyclone separator would not increase the tramming height of the continuous miner and could be mounted on presently available space of the continuous mining machine. A flexible tubular conduit with dust pick-ups of the manifold-type may be utilized to draw the coal dust into the cyclone separator. The openings in the dust pick-ups may be positioned immediately behind the cutting head and the flexible tubular conduit from the dust pick-ups to the cyclone separator could run through the body of the machine above the coal conveyor.

I claim:

1. A separating device for separating and removing dust particles in the form of a slurry from a dust particle laden gaseous stream comprising, a wet-type cyclone separator having an elongated body portion of circular cross-section including a separation chamber for the separation of dust particles from the dust particle laden gaseous stream and a collection chamber for collecting separated dust particles for continuous discharge therefrom, said separation chamber having a dust particle laden gas tangential inlet opening in the side wall thereof for the introduction of said dust particle laden gaseous stream into said separation chamber and a clean gas outlet opening in the top wall thereof for the withdrawal of the gaseous stream with the dust particles separated therefrom from said separation chamber, vacuum pump means connected to said gas outlet opening and operable to pull said dust particle laden gaseous stream into the gas inlet opening of said wet-type cyclone separator and said clean gas from said wet-type separator through said clean gas outlet, said clean gas outlet opening having a depending conduit portion extending downwardly therefrom and into said separation chamber and communicating therewith, said separation chamber having an internal involute inlet duct extending interiorly of the separation chamber about the depending conduit portion for substantially at least one turn of the helix secured to the wall of said separation chamber having an inlet end and an outlet end and a peripheral outer wall, said inlet end connected to said dust particle laden gas inlet opening and the outlet end thereof terminating below said depending conduit portion of said clean gas outlet opening and adjacent said separation chamber wall, a scrubber duct exteriorly of the separation chamber having an inlet end portion and an outlet end portion, said outlet end portion connected to said dust particle laden gas inlet opening for conveying said dust laden gaseous stream into said involute duct, water spray means positioned in said scrubber duct adjacent said inlet portion, said spray means operable to spray water in droplet form in said scrubber duct to wet the dust particles in the dust particle laden gaseous stream, an air straightener means positioned in said scrubber duct to evenly distribute and straighten the flow of the wetted gaseous stream throughout the cross-section of said scrubber duct as it is conveyed from said inlet end portion thereof to said outlet end portion thereof and into said involute duct, said air straightener means including a plurality of longitudinally extending walls to collect said water droplets thereon and form a liquid film on said walls, said dust laden gaseous stream operable to convey said liquid film longitudinally on said walls for discharge into said involute duct for further wetting of said dust particle laden gas stream, said internal involute duct operable to discharge said liquid film and dust particles from said air straightener to a location within said separation chamber below said clean gas outlet opening to thereby prevent said slurry of liquid and dust particles from being conveyed through said clean gas outlet means into said vacuum pump, a discharge outlet connected to the bottom of said collection chamber for continuously discharging said separated dust particles mixed with said spray water in the form of a slurry, and a slurry discharge system connected to said discharge outlet for continuously withdrawing said separated dust particles mixed with said spray water in the form of a slurry.

2. The apparatus of claim 1 wherein said air straightener comprises a plurality of elongated tubes positioned adjacent one another and stacked one atop the other.

3. A separating device for separating and removing dust particles in the form of a slurry from a dust particle laden gaseous stream comprising, a pair of wet-type cyclone separators operating in parallel, each having an elongated body portion of circular cross-section including a separation chamber for the separation of dust particles from the dust particle laden gaseous stream and a collection chamber for collecting separated dust particles for continuous discharge therefrom, each of said separation chambers having a dust particle laden gas tangential inlet opening for the introduction of said dust particle laden gaseous stream into said separation chambers and each having a clean gas outlet opening in the top wall thereof for the withdrawal of the gaseous stream with the dust particles separated therefrom from said separation chambers, said separation chambers each having a clean gas conduit connected to said clean gas outlet openings which join to form a common clean gas conduit and a vacuum pump means connected to said common clean gas conduit to pull said dust particle laden gaseous stream into the gas inlet opening of said wet-type cyclone separator and said clean gas from said wet-type separator through said common clean gas conduit, said clean gas outlet openings each having a depending conduit portion extending downwardly therefrom and into said separation chambers and communicating therewith, each of said separation chambers having an internal involute inlet duct extending interiorly of the separation chamber about the depending conduit portion for substantially, at least one turn off the helix secured to the wall of said separation chamber having inlet ends and outlet ends and peripheral out walls, said inlet ends connected to said dust particle laden gas inlet openings and the outlet ends thereof terminating below said depending conduit portions of said clean gas outlet openings and adjacent said separation chamber walls, a pair of scrubber ducts extending exteriorly of the separation chambers each having an inlet end portion and an outlet end portion positioned adjacent one another, said outlet end portions connected to said dust particle laden gas inlet openings for conveying said dust laden gaseous stream into said separation chambers, water spray means positioned in said scrubber ducts adjacent said inlet portions, said spray means operable to spray water in droplet form in each of said scrubber ducts to wet the dust particles in the dust particle laden gaseous stream, an air straightener means positioned in each of said scrubber ducts to evenly distribute and straighten the flow of the wetted gaseous stream through the cross-section of said scrubber ducts as it is conveyed from said inlet end portions thereof to said outlet end portions thereof and into said involute ducts, each of said air straighteners including a plurality of longitudinally extending walls to collect said water droplets thereon and form a liquid film on said walls, said dust laden gaseous stream operable to convey said liquid film longitudinally on said walls for discharge into said involute duct for further wetting of said dust particle laden gas stream, each of said internal involute ducts operable to discharge said liquid film and dust particles from said air straightener to a location within said separation chamber below said clean gas outlet opening to thereby prevent said slurry of liquid and dust particles from being conveyed through said clean gas outlet means into said vacuum pump, a discharge outlet connected to the bottom of each of said collection chambers for continuously discharging said separated dust particles mixed with said spray water in the form of a slurry, and a slurry discharge system connected to said discharge outlet of each of said separation chambers for continuously withdrawing said separated dust particles mixed with said spray water in the form of a slurry.

References Cited

UNITED STATES PATENTS

| | | |
|---|---|---|
| 446,053 | 2/1891 | Bittinger. |
| 537,509 | 4/1895 | Wardle et al. 261—76 |
| 980,108 | 12/1910 | Lillie 261—111 |
| 1,130,849 | 3/1915 | Seymour 55—238 |
| 1,342,152 | 6/1920 | Bennett 55—418 |
| 1,754,126 | 4/1930 | Stievenart 55—238 |
| 2,118,167 | 5/1938 | Connor 55—458 X |
| 1,879,107 | 9/1932 | Couch 55—238 |
| 2,271,642 | 2/1942 | Holzwarth 55—237 X |
| 2,333,961 | 11/1943 | Sweeny 55—458 X |
| 2,360,355 | 10/1944 | McBride et al. 55—346 X |
| 2,575,607 | 11/1951 | Wallin 55—349 X |
| 2,729,301 | 1/1956 | Ekstrom. |
| 2,881,858 | 4/1959 | Krantz et al. 55—238 |
| 2,887,390 | 5/1959 | Coulter et al. 55—238 X |
| 2,983,333 | 5/1961 | Percevaut 55—238 |
| 3,011,769 | 12/1961 | Umbricht. |
| 3,167,413 | 1/1965 | Kiekens et al. |
| 3,212,235 | 10/1965 | MarKant. |
| 3,347,381 | 10/1967 | Minch et al. 261—112 X |

FOREIGN PATENTS

| | | |
|---|---|---|
| 934,344 | 1/1948 | France. |
| 374,795 | 6/1932 | Great Britain. |
| 425,413 | 3/1935 | Great Britain. |
| 98,710 | 4/1940 | Sweden. |

HARRY B. THORNTON, *Primary Examiner.*

B. NOZICK, *Assistant Examiner.*

U.S. Cl. X.R.

55—418, 430, 459; 261—116